(12) United States Patent
Jarvis (10) Patent No.: US 7,093,107 B2
(45) Date of Patent: Aug. 15, 2006

(54) BYPASS CIRCUITRY FOR USE IN A PIPELINED PROCESSOR

(75) Inventor: Anthony X. Jarvis, Acton, MA (US)

(73) Assignee: STMicroelectronics, Inc., Carrollton, TX (US)

( * ) Notice: Subject to any disclaimer, the term of this patent is extended or adjusted under 35 U.S.C. 154(b) by 882 days.

(21) Appl. No.: 09/751,377

(22) Filed: Dec. 29, 2000

(65) Prior Publication Data

US 2003/0014614 A1   Jan. 16, 2003

(51) Int. Cl.
  *G06F 15/00*   (2006.01)
(52) U.S. Cl. ..................................... 712/218
(58) Field of Classification Search ................ 712/218
  See application file for complete search history.

(56) References Cited

U.S. PATENT DOCUMENTS

| | | | | |
|---|---|---|---|---|
| 4,591,973 A | * | 5/1986 | Ferris et al. | 710/3 |
| 4,982,283 A | * | 1/1991 | Acampora | 375/240.12 |
| 5,467,476 A | * | 11/1995 | Kawasaki | 712/23 |
| 5,764,943 A | * | 6/1998 | Wechsler | 712/218 |
| 5,805,852 A | * | 9/1998 | Nakanishi | 712/218 |
| 5,872,986 A | | 2/1999 | Heeb | 395/800.01 |
| 5,974,537 A | * | 10/1999 | Mehra | 712/215 |
| 6,078,196 A | | 6/2000 | Gayles | 326/121 |
| 6,105,123 A | * | 8/2000 | Raje | 712/24 |
| 6,167,501 A | * | 12/2000 | Barry et al. | 712/11 |
| 6,170,051 B1 | * | 1/2001 | Dowling | 712/225 |

FOREIGN PATENT DOCUMENTS

EP   0 730 223 A1   9/1996

OTHER PUBLICATIONS

Patterson et al., Computer Organization & Design: The Hardware/Software Interface, 1998, Morgan Kaufmann Publishers, p. B-9.*

(Continued)

*Primary Examiner*—Eddie Chan
*Assistant Examiner*—Aimee Li
(74) *Attorney, Agent, or Firm*—Lisa K. Jorgenson; William A. Munck (57) ABSTRACT

There is disclosed a data processor that uses bypass circuitry to transfer result data from late pipeline stages to earlier pipeline stages in an efficient manner and with a minimum amount of wiring. The data processor comprises: 1) an instruction execution pipeline comprising a) a read stage; b) a write stage; and c) a first execution stage comprising E execution units that produce data results from data operands. The data processor also comprises: 2) a register file comprising a plurality of data registers, each of the data registers being read by the read stage of the instruction pipeline via at least one of R read ports of the register file and each of the data registers being written by the write stage of the instruction pipeline via at least one of W write ports of the register file; and 3) bypass circuitry for receiving data results from output channels of source devices in at least one of the write stage and the first execution stage, the bypass circuitry comprising a first plurality of bypass tristate line drivers having input channels coupled to first output channels of a first plurality of source devices and tristate output channels coupled to a first common read data channel in the read stage.

20 Claims, 4 Drawing Sheets

OTHER PUBLICATIONS

Katz, Randy H. "Contemporary Logic Design". University of California. Benjamin Cummings/Addison Wesley Publishing Company 1993. © 1996 Chapter 11: Computer Organization. Section 3: Busing Strategies. http://www2.ele.ufes.br/~ailson/digital2/cld/CLD.ht.*

Trainis. Simon A.; "Modelling the Hardware Cost of Full Register Bypassing in a Multiple Instruction Issue Processor"; XP 000679755;. Journal of Systems Architecture; 1997 Published by Elsevier Science B.V.; pp. 39-46.

* cited by examiner

BYPASS CIRCUITRY FOR USE IN A PIPELINED PROCESSOR

CROSS-REFERENCE TO RELATED APPLICATIONS

The present invention is related to those disclosed in the following U.S. patent applications:

1) Ser. No. 09/751,372, filed concurrently herewith, entitled "SYSTEM AND METHOD FOR EXECUTING VARIABLE LATENCY LOAD OPERATIONS IN A DATA PROCESSOR";
2) Ser. No. 09/751,331, filed concurrently herewith, entitled "PROCESSOR PIPELINE STALL APPARATUS AND METHOD OF OPERATION";
3) Ser. No. 09/751,371, filed concurrently herewith, entitled "CIRCUIT AND METHOD FOR HARDWARE-ASSISTED SOFTWARE FLUSHING OF DATA AND INSTRUCTION CACHES";
4) Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";
5) Ser. No. 09/751,410, filed concurrently herewith, entitled "SYSTEM AND METHOD FOR EXECUTING CONDITIONAL BRANCH INSTRUCTIONS IN A DATA PROCESSOR";
6) Ser. No. 09/751,408, filed concurrently herewith, entitled "SYSTEM AND METHOD FOR ENCODING CONSTANT OPERANDS IN A WIDE ISSUE PROCESSOR";
7) Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";
8) Ser. No. 09/751,674, filed concurrently herewith, entitled "CiRCUIT AND METHOD FOR INSTRUCTION COMPRESSION AND DISPERSAL IN WIDE-ISSUE PROCESSORS";
9) Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10) Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to a bypass circuitry for transferring data between stages in a pipelined data processor.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution rate advantage that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors.

However, in many applications it is essential to minimize the size, cost, and power requirements of a data processor. This has led to the development of processors that are optimized to meet particular size, cost and/or power limits. For example, the recently developed Transmeta Crusoe™ processor greatly reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices). The general design objectives for data processors used in consumer appliances and office equipment are the minimization of cost and complexity of the data processor.

The throughput of a processor may also be improved by reducing the latency between an instruction that writes a result to a register and a subsequent instruction that reads the result from the same register. If both instructions are in the pipeline at the same time, the read operation cannot be permitted to read the result until after the write operation is complete, otherwise the data will not be valid. Unfortunately, a read operation (i.e., the read stage) occurs relatively early in the instruction pipeline, whereas the write operation (i.e., the write stage) occurs last. To prevent an invalid read operation from occurring, it is necessary to stall read operation in the pipeline until after the write operation completes. Unfortunately, this increases latency and reduces the throughput of the data processor.

The problem of latency in write-followed-by-read operations can be minimized by using bypass circuitry that transfers a result that is still in the processor pipeline to be transferred directly to the read stage even before the result is written to the register file. It is recalled from above that in an exemplary data processor, the read stage fetches required operands from the register file, the E1 and E2 stages perform the actual program operation on the operands and generate the result, and the write stage then writes the result generated by the E1 and E2 stages back into the data cache or the register file. To reduce latency, bypass circuitry may be implemented to transfer a result from the E1 stage or the E2 stage (or both) directly to the read stage as soon as the result is available in the E1 or E2 stage. Bypass circuitry also may be implemented to transfer a result from the write stage directly to the read stage as soon as the result is available in the write stage. In this manner the delay incurred by actually writing the result into the register file and then reading the result back out of the register file is avoided.

Unfortunately, as the number of read ports and write ports in a multi-ported register file and the number of pipeline stages increases, the amount and complexity of the bypass circuitry becomes very great. For example, if the E1 pipeline stage comprises four identical execution units and each one reads two operands to produce one result, the register file needs twelve ports, including eight read ports and four write ports. If bypass circuitry is implemented between the eight operand data paths of the four execution units and the twelve result outputs from the three stages, then 96 bypass data paths are required. In a 32-bit register file architecture, each of these 96 bypass data paths is 32 bits wide. This results in a very large bypass network.

Therefore, there is a need in the art for data processors that implement pipeline architectures that minimize the latency in read-after-write operations. In particular, there is an need for a pipelined data processors comprising improved bypass circuitry for transferring result data from late pipeline stages to earlier pipeline stages. More particularly, there is need for an improved execution pipeline that minimizes the amount and complexity of bypass circuitry needed to bypass results data to be written to a multi-ported register file to earlier pipeline stages.

SUMMARY OF THE INVENTION

To address the above-discussed deficiencies of the prior art, it is a primary object of the present invention to provide a data processor that implements bypass circuitry that transfers result data from late pipeline stages to earlier pipeline stages in an efficient manner and with a minimum amount of wiring. According to an advantageous embodiment of the present invention, the data processor comprises: 1) an instruction execution pipeline comprising a) a read stage; b) a write stage; and c) a first execution stage comprising E execution units capable of producing data results from data operands; 2) a register file comprising a plurality of data registers, each of the data registers capable of being read by the read stage of the instruction pipeline via at least one of R read ports of the register file and each of the data registers capable of being written by the write stage of the instruction pipeline via at least one of W write ports of the register file; and 3) bypass circuitry capable of receiving data results from output channels of source devices in at least one of the write stage and the first execution stage, the bypass circuitry comprising a first plurality of bypass tristate line drivers having input channels coupled to first output channels of a first plurality of the source devices and tristate output channels coupled to a first common read data channel in the read stage.

According to one embodiment of the present invention, the bypass circuitry further comprises a second plurality of bypass tristate line drivers having input channels coupled to the first output channels of the first plurality of the source devices and tristate output channels coupled to a second common read data channel in the read stage.

According to another embodiment of the present invention, the data processor further comprises a first register file tristate line driver having an input channel coupled to a first one of the R read ports and an output channel coupled to the first common read data channel in the read stage.

According to still another embodiment of the present invention, the data processor further comprises a second register file tristate line driver having an input channel coupled to a second one of the R read ports and an output channel coupled to the second common read data channel in the read stage.

According to yet another embodiment of the present invention, the data processor further comprises a first multiplexer having a first input channel coupled to the first common read data channel and an output channel coupled to a first operand channel of a first execution unit in the first execution stage.

According to a further embodiment of the present invention, the data processor further comprises a second multiplexer having a first input channel coupled to the second common read data channel and an output channel coupled to a second operand channel of the first execution unit in the first execution stage.

According to a still further embodiment of the present invention, the bypass circuitry comprises a first bypass channel coupling an output channel of the first execution unit to a second input channel of the first multiplexer.

According to a yet further embodiment of the present invention, the first bypass channel couples the output channel of the first execution unit to a second input channel of the second multiplexer.

In one embodiment of the present invention, the bypass circuitry further comprises a second bypass channel coupling an output channel of a second execution unit in the first execution stage to a third input channel of the first multiplexer.

In another embodiment of the present invention, the second bypass channel couples the output channel of the second execution unit to a third input channel of the second multiplexer.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
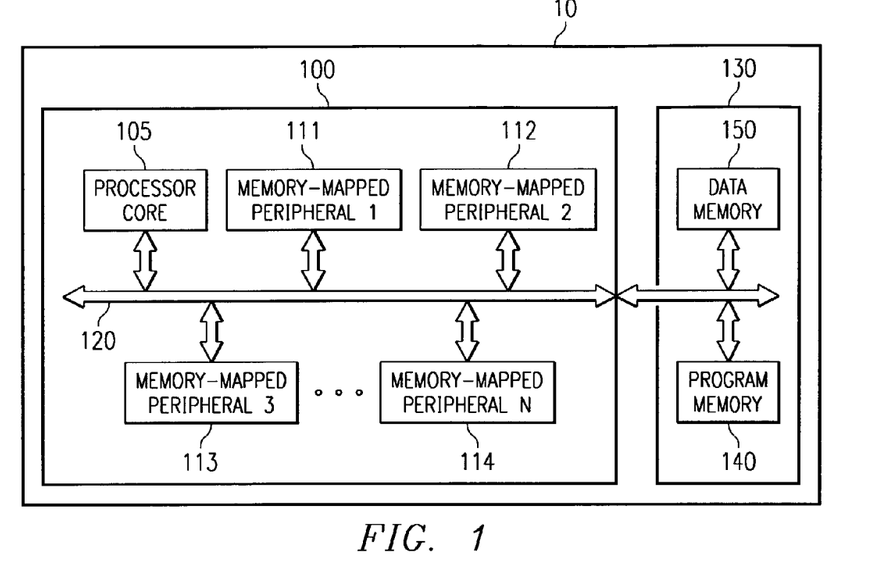
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111–114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 may be externally coupled to data processor 100. Similarly, in another embodiment of the present invention, one or both of program memory 140 and data memory 150 may be disposed on-chip in data processor 100.

Figure 2:
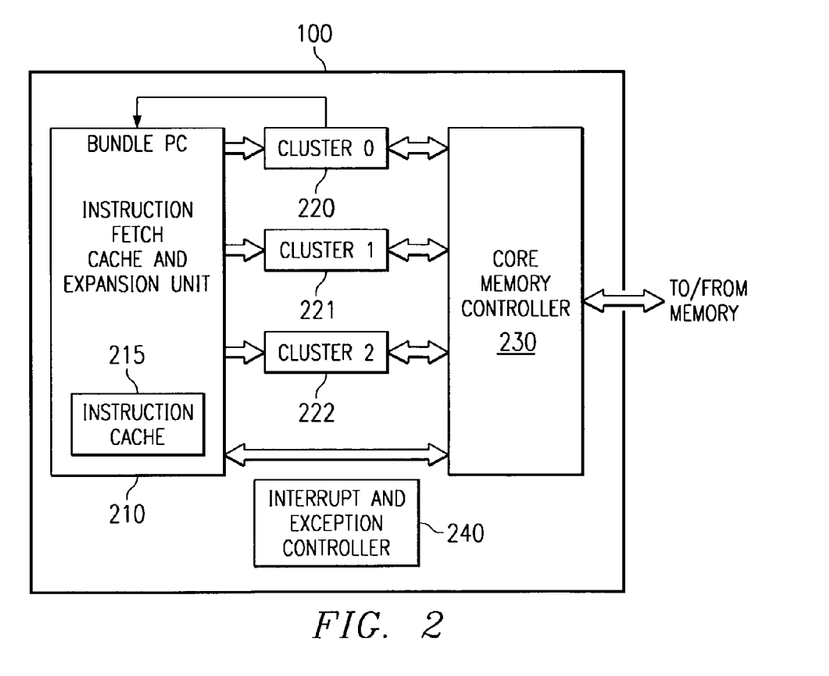
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220-222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220–222 are basic execution units that comprise one more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
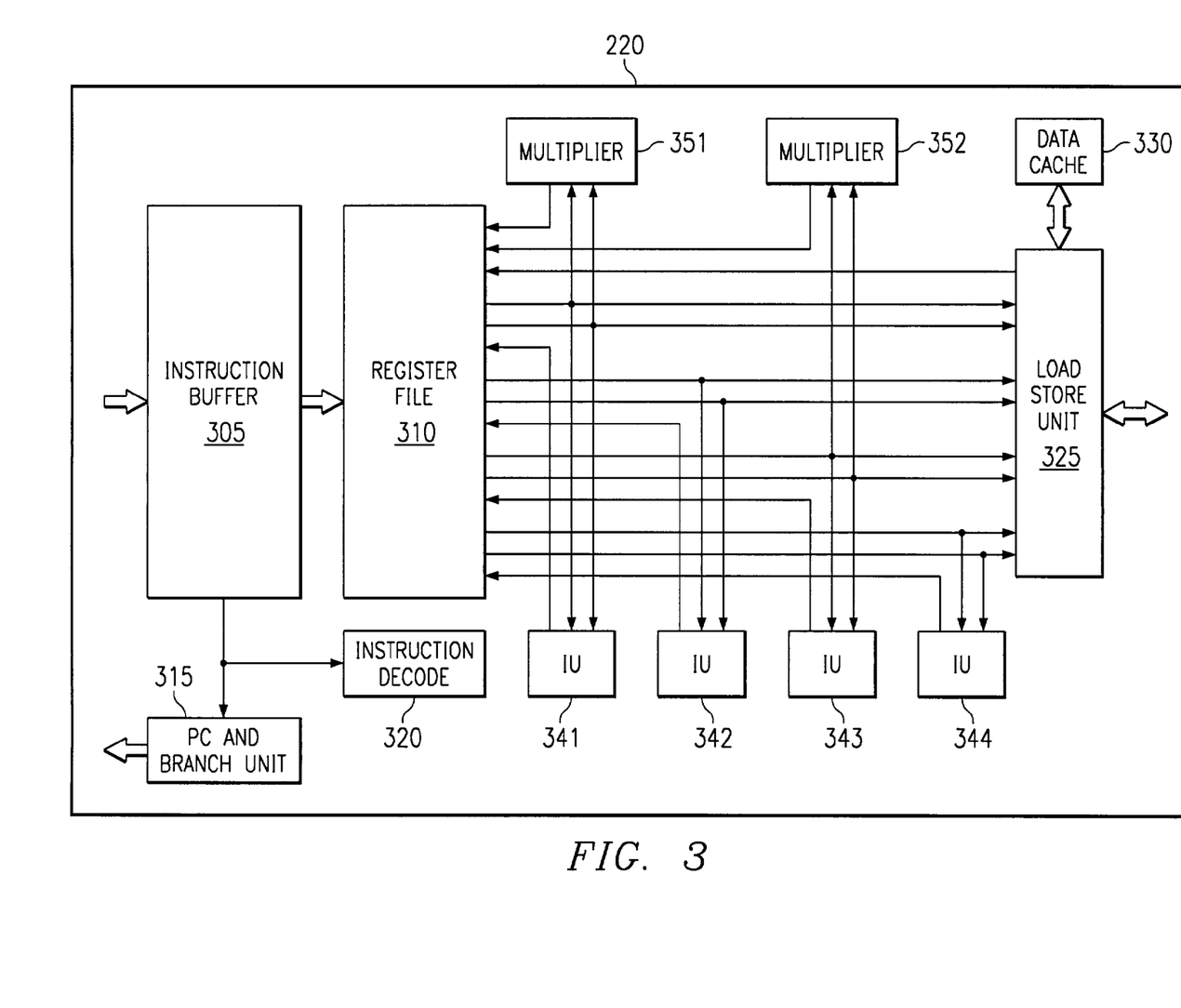
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341–344, and multipliers 351–352. Cluster 220 is implemented as an instruction pipeline.

Instructions are issued to an operand read stage associated with register file 310 and then propagated to the execution units (i.e., integer units 341–244, multipliers 351–352). Cluster 220 accepts one bundle comprising one to four syllables in each cycle. The bundle may consist of any combination of four integer operations, two multiplication operations, one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
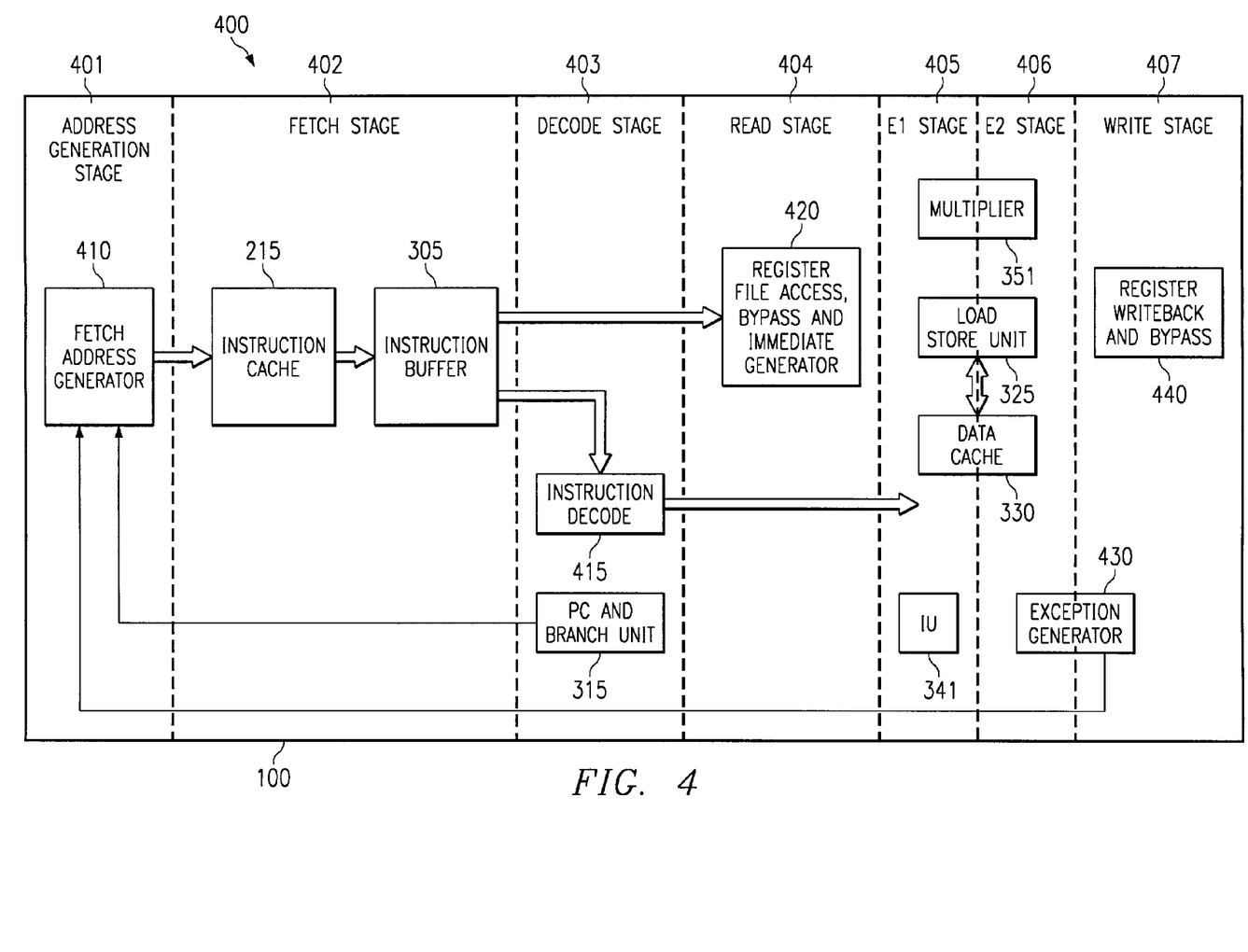
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

Figure 5:
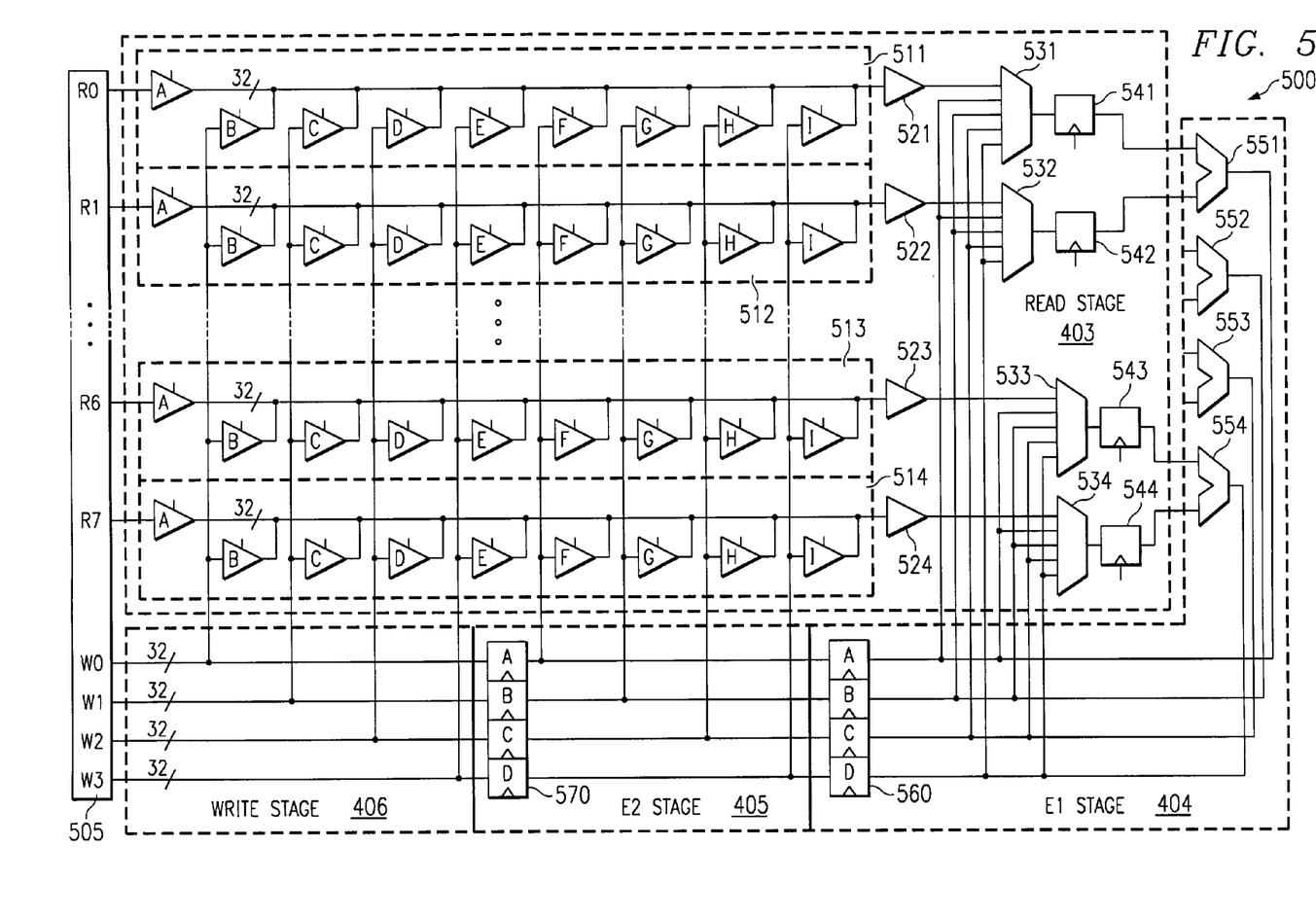
FIG. 5 is a block diagram illustrating the bypass circuitry in the exemplary data processor according to one embodiment of the present invention.

As noted above, data processor 100 reduces latency by using bypass circuitry to transfer a result from E1 stage 405, E2 stage 406, or write stage 306 directly to read stage 404 as soon as the result is available in E1 stage 405, E2 stage 406, and write stage 306. FIG. 5 is a block diagram illustrating exemplary bypass circuitry 500 according to one embodiment of the present invention. Bypass circuitry 500 comprises a plurality of 32-bit bypass tristate line drivers, including exemplary 32-bit bypass line drivers 511B–511I, 512B–512I, 513B–513I, and 514B–514I, that receive bypass data from write stage 407 and E2 stage 406. The outputs of the bypass tristate line drivers are connected together at the inputs of a plurality of 32-bit read line buffers, including exemplary 32-bit buffers 511–514. The tristate line drivers also comprise 32-bit register file tristate line drivers (including exemplary 32-bit register file line drivers 511A, 512A, 513A and 514A) that receive register file data from the eight (8) read ports (R0 through R7) of register file 505. The 32-bit outputs of the register file line drivers are also coupled to the inputs of the 32-bit read line buffers, including exemplary buffers 511–514.

The outputs of the read line buffers are coupled to selected ones of the 32-bit input channels of a bank of read-stage multiplexers, including exemplary 32-bit multiplexers 531–534. The other input channels of the read-stage multiplexers receive bypass data from E1 stage 405. The 32-bit outputs of the read-stage multiplexers are coupled to a plurality of read-stage latches, including exemplary latches 541–544 at the boundary of read stage 404. The 32-bit outputs of the read-stage latches are applied to the inputs of a plurality of execution units in E1 stage 405, including exemplary arithmetic logic units (ALUs) 551–554.

In the illustrated embodiment, register file 505 has eight 32 bit read ports (R0–R7) and four 32-bit write ports (W0–W3) Although each of read ports R0–R7 is coupled to a network of line drivers, including register file line drivers (e.g., line drivers 511A, 512A, 513A and 514A) and bypass line drivers (e.g., line drivers 511B–511I, 512B–512I, 513B–513I and 514B–514I), only the network of line drivers coupled to read ports R0, R1, R6 and R7 are shown. Furthermore, only the read-stage multiplexers and read-stage latches coupled to the read data paths associated with read ports R0, R1, R6 and R7 are shown. The corresponding register file line drivers, bypass line drivers, read-stage multiplexers and read stage latches associated with read ports R2, R3, R4 and R5 are not shown in order to avoid redundant description and to clarify and simplify the explanation of the present invention. Finally, much of the functional circuitry in read stage 404, E1 stage 405, E2 stage 406 and write stage 407 has been omitted in order to emphasize the bypass circuitry according to the principles of the present invention.

As FIG. 5 illustrates, the results of mathematical and/or logical functions produced by execution units in E1 stage 405 can be bypassed directly to read stage 404 via the input channels of the read-stage multiplexers. For example, the results produced by ALU 551 and ALU 552 are directly bypassed back to the input channels of read-stage multiplexers 531 and 532. Similarly, any of the results produced by the execution units in E1 stage 405 may be bypassed to the read-stage multiplexers from the outputs of latches 560A–560D via the bypass line drivers. For example, the output of latch 560A may be bypassed to read-stage multiplexer 531 via bypass tristate line driver 511F. Furthermore, any of the results produced by the execution units in E1 stage 405 or E2 stage 406 may be bypassed to the read-stage multiplexers from the outputs of latches 570A–570D via the bypass line drivers. For example, the output of latch 570A may be bypassed to read-stage multiplexer 531 via bypass tristate line driver 511B. Finally, for speed purposes, any of the results produced by the execution units in E1 stage 405 may be bypassed directly to the read-stage multiplexers from the outputs of the execution units (e.g., ALU 531–ALU 534) without passing through the bypass line drivers. Because the results from the execution units are produced late in the cycle, tristate line drivers are not used to couple the outputs of the execution units with the inputs of the read-stage multiplexers, thereby reducing propagation delays and latency.

In the illustrated embodiment, register file 505 has eight read ports and four write ports, and eight bypass circuits are used to connect each read data path to write stage 407 and E2 stage 406. Additionally, each data path (read and write) is thirty-two bits wide and there are four separate execution units. However, it should be understood that the selection of these values is by way of example only and should not be construed to limit the scope of the present invention. Those skilled in the art will recognize that other numbers of read ports and write ports in register file 505 could have been used and greater or smaller number of execution units could have been implemented.

Although the present invention has been described in detail, those skilled in the art should understand that they can make various changes, substitutions and alterations herein without departing from the spirit and scope of the invention in its broadest form.

What is claimed is:

1. A data processor comprising:
    an instruction execution pipeline comprising:
        a read stage;
        a write stage; and
        a first execution stage comprising E execution units capable of producing data results from data operands;
    a register file comprising a plurality of data registers, each of said data registers capable of being read by said read stage of said instruction pipeline via at least one of R read ports of said register file and each of said data registers capable of being written by said write stage of said instruction pipeline via at least one of W write ports of said register file; and
    bypass circuitry capable of receiving data results from output channels of source devices in at least one of said write stage and said first execution stage, said bypass circuitry comprising:
        a first plurality of bypass tristate line drivers having input channels coupled to first output channels of a first plurality of said source devices and tristate output channels coupled to a first common read data channel in said read stage; and
        a first multiplexer having a first input channel coupled to said first common read data channel and an output channel coupled to a first operand channel of a first execution unit in said first execution stage.

2. The data processor as set forth in claim 1 wherein said bypass circuitry further comprises a second plurality of bypass tristate line drivers having input channels coupled to said first output channels of said first plurality of said source devices and tristate output channels coupled to a second common read data channel in said read stage.

3. The data processor as set forth in claim 2 further comprising a first register file tristate line driver having an input channel coupled to a first one of said R read ports and an output channel coupled to said first common read data channel in said read stage.

4. The data processor as set forth in claim 3 further comprising a second register file tristate line driver having an input channel coupled to a second one of said R read ports and an output channel coupled to said second common read data channel in said read stage.

5. The data processor as set forth in claim 4 further comprising a second multiplexer having a first input channel coupled to said second common read data channel and an output channel coupled to a second operand channel of said first execution unit in said first execution stage.

6. The data processor as set forth in claim 5 wherein said bypass circuitry further comprises a first bypass channel coupling an output channel of said first execution unit to a second input channel of said first multiplexer.

7. The data processor as set forth in claim 6 wherein said first bypass channel couples said output channel of said first execution unit to a second input channel of said second multiplexer.

8. The data processor as set forth in claim 7 wherein said bypass circuitry further comprises a second bypass channel coupling an output channel of a second execution unit in said first execution stage to a third input channel of said first multiplexer.

9. The data processor as set forth in claim 8 wherein said second bypass channel couples said output channel of said second execution unit to a third input channel of said second multiplexer.

10. The data processor of claim 1, further comprising a latch coupled to the output channel of the first multiplexer and to the first operand channel of the first execution unit.

11. A processing system comprising:
    a data processor, wherein said data processor comprises:
        an instruction execution pipeline comprising:
            a read stage;
            a write stage; and
            a first execution stage comprising E execution units capable of producing data results from data operands;
        a register file comprising a plurality of data registers, each of said data registers capable of being read by said read stage of said instruction pipeline via at least one of R read ports of said register file and each of said data registers capable of being written by said write stage of said instruction pipeline via at least one of W write ports of said register file; and
        bypass circuitry capable of receiving data results from output channels of source devices in at least one of said write stage and said first execution stage, said bypass circuitry comprising:

a first plurality of bypass tristate line drivers having input channels coupled to first output channels of a first plurality of said source devices and tristate output channels coupled to a first common read data channel in said read stage; and a first multiplexer having a first input channel coupled to said first common read data channel and an output channel coupled to a first operand channel of a first execution unit in said first execution stage;

a memory coupled to said data processor; and a plurality of memory-mapped peripheral circuits coupled to said data processor for performing selected functions in association with said data processor.

12. The processing system as set forth in claim 11 wherein said bypass circuitry further comprises a second plurality of bypass tristate line drivers having input channels coupled to said first output channels of said first plurality of said source devices and tristate output channels coupled to a second common read data channel in said read stage.

13. The processing system as set forth in claim 12 further comprising a first register file tristate line driver having an input channel coupled to a first one of said R read ports and an output channel coupled to said first common read data channel in said read stage.

14. The processing system as set forth in claim 13 further comprising a second register file tristate line driver having an input channel coupled to a second one of said R read ports and an output channel coupled to said second common read data channel in said read stage.

15. The processing system as set forth in claim 14 further comprising a second multiplexer having a first input channel coupled to said second common read data channel and an output channel coupled to a second operand channel of said first execution unit in said first execution stage.

16. The processing system as set forth in claim 15 wherein said bypass circuitry further comprises a first bypass channel coupling an output channel of said first execution unit to a second input channel of said first multiplexer.

17. The processing system as set forth in claim 16 wherein said first bypass channel couples said output channel of said first execution unit to a second input channel of said second multiplexer.

18. The processing system as set forth in claim 17 wherein said bypass circuitry further comprises a second bypass channel coupling an output channel of a second execution unit in said first execution stage to a third input channel of said first multiplexer.

19. The processing system as set forth in claim 18 wherein said second bypass channel couples said output channel of said second execution unit to a third input channel of said second multiplexer.

20. The processing system of claim 11, further comprising a latch coupled to the output channel of the first multiplexer and to the first operand channel of the first execution unit.

* * * * *